United States Patent
Takaishi

(10) Patent No.: US 9,200,698 B2
(45) Date of Patent: Dec. 1, 2015

(54) ROLLER-TYPE FRICTION TRANSMISSION UNIT

(75) Inventor: Tetsu Takaishi, Chigasaki (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 462 days.

(21) Appl. No.: 13/818,528

(22) PCT Filed: Sep. 27, 2011

(86) PCT No.: PCT/JP2011/072017
§ 371 (c)(1),
(2), (4) Date: Feb. 22, 2013

(87) PCT Pub. No.: WO2012/066854
PCT Pub. Date: May 24, 2012

(65) Prior Publication Data
US 2013/0157803 A1   Jun. 20, 2013

(30) Foreign Application Priority Data

Nov. 18, 2010   (JP) .................................. 2010-258044

(51) Int. Cl.
| | |
|---|---|
| *F16H 13/04* | (2006.01) |
| *F16H 13/02* | (2006.01) |
| *B60K 17/344* | (2006.01) |

(52) U.S. Cl.
CPC .............. *F16H 13/04* (2013.01); *B60K 17/344* (2013.01); *F16H 13/02* (2013.01)

(58) Field of Classification Search
CPC ........ F16H 13/04; F16H 13/02; B60K 17/344
See application file for complete search history.

(56) References Cited

U.S. PATENT DOCUMENTS

| | | | |
|---|---|---|---|
| 1,709,345 A | | 4/1929 | Garrard |
| 1,910,777 A | | 5/1933 | Soddy |
| 3,241,383 A | * | 3/1966 | Nitschke ......................... 476/72 |
| 3,848,476 A | | 11/1974 | Kraus |
| 4,051,695 A | * | 10/1977 | Phillips et al. ................ 464/106 |

(Continued)

FOREIGN PATENT DOCUMENTS

| | | |
|---|---|---|
| EP | 2 236 341 A1 | 10/2010 |
| FR | 2 232 706 A1 | 1/1975 |
| FR | 2 502 359 A1 | 9/1982 |

(Continued)

OTHER PUBLICATIONS

Supplementary European Search Report dated Mar. 19, 2014 (6 pgs.).

*Primary Examiner* — David M Fenstermacher
(74) *Attorney, Agent, or Firm* — Foley & Lardner LLP

(57) ABSTRACT

In a roller-type friction transmission unit, outer peripheral surfaces of first and second rollers are pressed in a radial direction into pressing contact with one another, to allow frictional power transmission between the first and second rollers. The first roller is connected to a driveline to main driving wheels of a four wheel drive vehicle. The second roller is connected to a driveline to auxiliary driving wheels of the four wheel drive vehicle. The transmitted torque capacity between the first roller and the second roller is controlled by changing a distance between rotation axes of the first and second rollers. The outer peripheral surfaces of the first and second rollers are shaped to allow the outer peripheral surfaces of the first and second rollers to be in contact with one another at a plurality of spots arranged in an axial direction.

4 Claims, 5 Drawing Sheets

(56) References Cited

U.S. PATENT DOCUMENTS

| | | | |
|---|---|---|---|
| 4,128,016 A * | 12/1978 | Nasvytis | 476/27 |
| 6,849,025 B2 * | 2/2005 | Chikaraishi et al. | 476/21 |
| 8,402,851 B2 * | 3/2013 | Mori et al. | 74/67 |
| 8,483,921 B2 * | 7/2013 | Sakagami et al. | 701/69 |
| 8,579,757 B2 * | 11/2013 | Sakagami et al. | 476/67 |
| 8,944,955 B2 * | 2/2015 | Ogawa | 476/67 |
| 2004/0198549 A1 | 10/2004 | Wafzig | |
| 2010/0276246 A1 | 11/2010 | Mori et al. | |

FOREIGN PATENT DOCUMENTS

| | | |
|---|---|---|
| JP | 57-184351 A | 11/1982 |
| JP | 2002-087092 A | 3/2002 |
| JP | 2004-306948 A | 11/2004 |
| JP | 2009-173261 A | 8/2009 |
| JP | 2010-195198 A | 9/2010 |

* cited by examiner

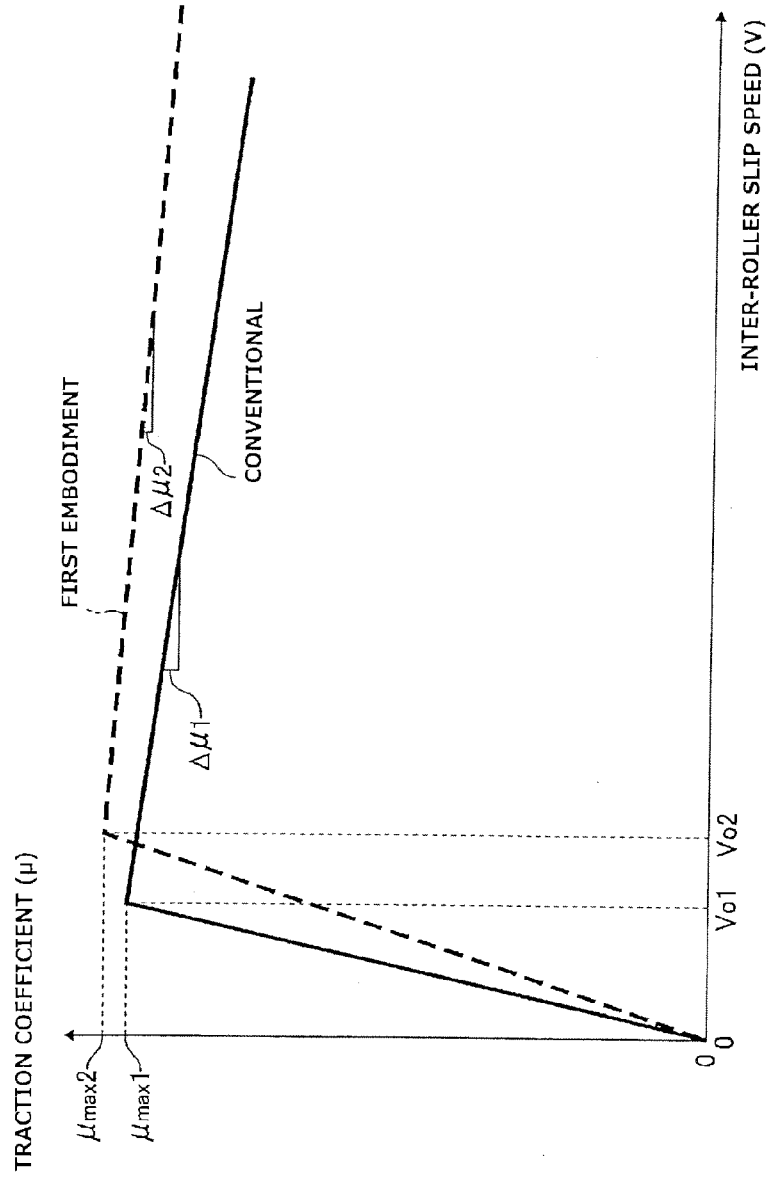

ROLLER-TYPE FRICTION TRANSMISSION UNIT

TECHNICAL FIELD

The present invention relates to a roller-type friction transmission unit which is used as a transfer of a four wheel drive vehicle, and particularly relates to a technique for suppressing judder (noise, vibration) occurring between rollers in the roller-type friction transmission unit.

BACKGROUND ART

Such a roller-type friction transmission unit is known as is described in a patent document 1. The roller-type friction transmission unit described in this document includes a pair of rollers, wherein an outer peripheral surface of a first roller and an outer peripheral surface of a second roller are pressed in a radial direction of the first and second rollers into pressing contact with one another, to allow frictional power transmission between the first and second rollers; the first roller is connected to a driveline to main driving wheels of a four wheel drive vehicle; and the second roller is connected to a driveline to auxiliary driving wheels of the four wheel drive vehicle.

In the case of this roller-type friction transmission unit, if the outer peripheral surfaces of the rollers in contact with one another are cylindrical surfaces, the outer peripheral surfaces are in line contact with one another. Accordingly, if the parallelism between the roller rotation axes is lowered by errors in assembling or errors in precision of parts, it significantly adversely affects the endurance and transmission efficiency of the roller-type friction transmission unit. In this way, it is disadvantageous in view of robustness.

Accordingly, in a typical roller-type friction transmission unit, the outer peripheral surface of one roller is formed to have a relatively raised portion middle in the axial direction, so that the outer peripheral surfaces of the rollers are in point contact with each other. In such a case, even if the parallelism between the roller rotation axes is lowered by errors in assembling or errors in precision of parts, the point contact between the outer peripheral surfaces of the rollers is maintained so that it does not significantly adversely affect the endurance and transmission efficiency of the roller-type friction transmission unit. In this way, it is superior in robustness.

However, in the case of the conventional roller-type friction transmission unit described above, the configuration that roller outer peripheral surfaces are in frictional contact with each other at a single point may raise the contact pressure between the rollers at that contact point, and thereby cause the following problem.

A roller-type friction transmission unit has a characteristic of change of traction coefficient (μ) with respect to inter-roller slip speed (V), which is so-called the μ-V characteristic, in which characteristic, traction coefficient (μ) rapidly rises to a maximum value immediately after the occurrence of inter-roller slip speed (V), and thereafter traction coefficient (μ) gradually decreases from the maximum value as inter-roller slip speed (V) increases.

Although that tendency of μ-V characteristic is unchanged, the ideal slip speed (Vo) that is inter-roller slip speed (V) when traction coefficient (μ) reaches the maximum value, the maximum value (μmax) of traction coefficient (μ), the range of negative gradient in which traction coefficient (μ) gradually decreases from the maximum value (μmax), and the descending gradient (Δμ) of traction coefficient (μ), vary according to the contact pressure between the rollers at a spot of contact between the roller outer peripheral surfaces. Specifically, as the contact pressure between the rollers increases, (1) ideal slip speed (Vo) decreases to broaden the range of negative gradient, (2) the maximum value (μmax) of traction coefficient (μ) becomes small, and (3) the descending gradient (Δμ) of traction coefficient (μ) becomes rapid in addition to the broadening of the range of negative gradient, thereby increasing the amount of descending of traction coefficient (μ) in the range of negative gradient.

In a conventional roller-type friction transmission unit, the feature that the roller outer peripheral surfaces are in contact with each other only at one point, and the inter-roller contact pressure at that point is high, results in that the μ-V characteristic has the tendencies (1)-(3) described above as indicated by a solid line in FIG. 5, so that smooth power transmission is difficult in the range of negative gradient of the μ-V characteristic, wherein judder (noise, vibration) tends to occur between the rollers.

PRIOR ART DOCUMENT(S)

Patent Document(s)

Patent Document 1: JP 2009-173261 A

SUMMARY OF THE INVENTION

It is an object of the present invention to provide a roller-type friction transmission unit that is configured to set the inter-roller contact pressure low and suppress judder from occurring between the rollers as described above, and thereby solve the problem described above.

According to the present invention, in a roller-type friction transmission unit, an outer peripheral surface of a first roller and an outer peripheral surface of a second roller are pressed in a radial direction of the first and second rollers into pressing contact with one another, to allow frictional power transmission between the first and second rollers; one of the first and second rollers is connected to a driveline to main driving wheels of a four wheel drive vehicle; and another one of the first and second rollers is connected to a driveline to auxiliary driving wheels of the four wheel drive vehicle.

In the present invention, the outer peripheral surface of the first roller and the outer peripheral surface of the second roller are shaped to allow the outer peripheral surface of the first roller and the outer peripheral surface of the second roller to be in contact with one another at a plurality of spots arranged in an axial direction of the first and second rollers.

According to the roller-type friction transmission unit of the present invention, the feature that the outer peripheral surface of the first roller and the outer peripheral surface of the second roller are in contact with one another at a plurality of spots, serves to lower the inter-roller contact pressure at each contact spot.

This results in narrowing the range of negative gradient and making mild the descending gradient of the traction coefficient in the range of negative gradient, and further increasing the maximum value of the traction coefficient, to allow smooth power transmission even in the range of negative gradient. This serves to suppress judder (noise, vibration) from occurring between the rollers in the range of negative gradient, and to solve the problem about judder described above.

BRIEF DESCRIPTION OF THE DRAWINGS

FIG. 5 is a characteristic diagram showing a characteristic of change of traction coefficient with respect to inter-roller slip speed in the roller-type friction transmission unit according to the first embodiment shown in FIGS. 1, 2.

MODE(S) FOR CARRYING OUT THE INVENTION

The following describes embodiments of the present invention in detail with reference to the drawings.

Configuration of First Embodiment

Figure 1:
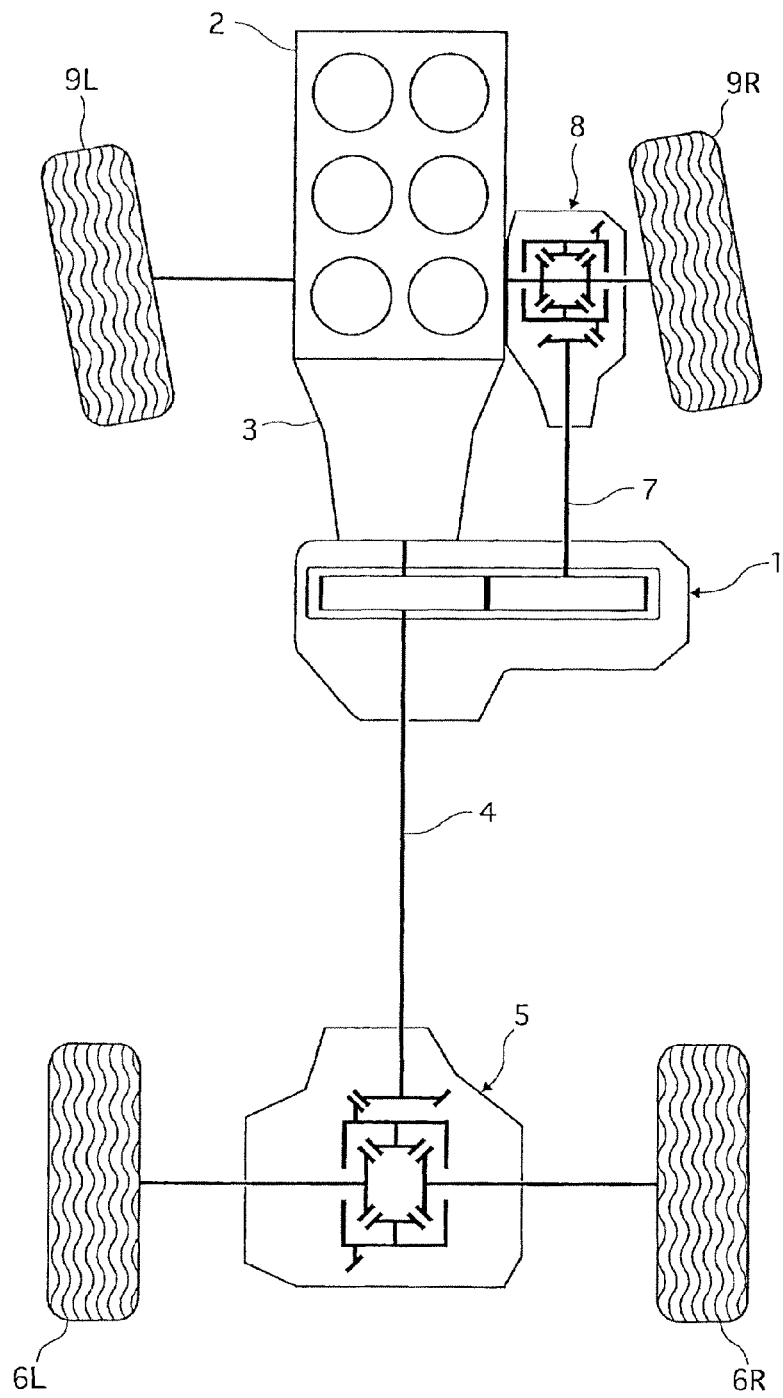
FIG. 1 is a schematic plan view from above a four wheel drive vehicle, showing a powertrain of the four wheel drive vehicle which is provided with a roller-type friction transmission unit according to a first embodiment of the present invention.

FIG. 1 is a schematic plan view from above a four wheel drive vehicle, showing a powertrain of the four wheel drive vehicle which is provided with a roller-type friction transmission unit 1 according to a first embodiment of the present invention.

The four wheel drive vehicle of FIG. 1 is based on a rear wheel drive vehicle in which rotation from an engine 2 is shifted by a transmission 3, and then transmitted through a rear propeller shaft 4 and a rear final drive unit 5 to left and right rear wheels 6L, 6R, and constructed so that a part of torque to left and right rear wheels (main driving wheels) 6L, 6R is transmitted by roller-type friction transmission unit 1 through a front propeller shaft 7 and a front final drive unit 8 to left and right front wheels (auxiliary driving wheels) 9L, 9R, thus achieving four wheel driving.

Roller-type friction transmission unit 1 is thus configured to set a torque distribution ratio between left and right rear wheels (main driving wheels) 6L, 6R, and left and right front wheels (auxiliary driving wheels) 9L, 9R by splitting and outputting to left and right front wheels (auxiliary driving wheels) 9L, 9R a part of torque to left and right rear wheels (main driving wheels) 6L, 6R. In this embodiment, roller-type friction transmission unit 1 is constructed as shown in FIG. 2.

Figure 2:
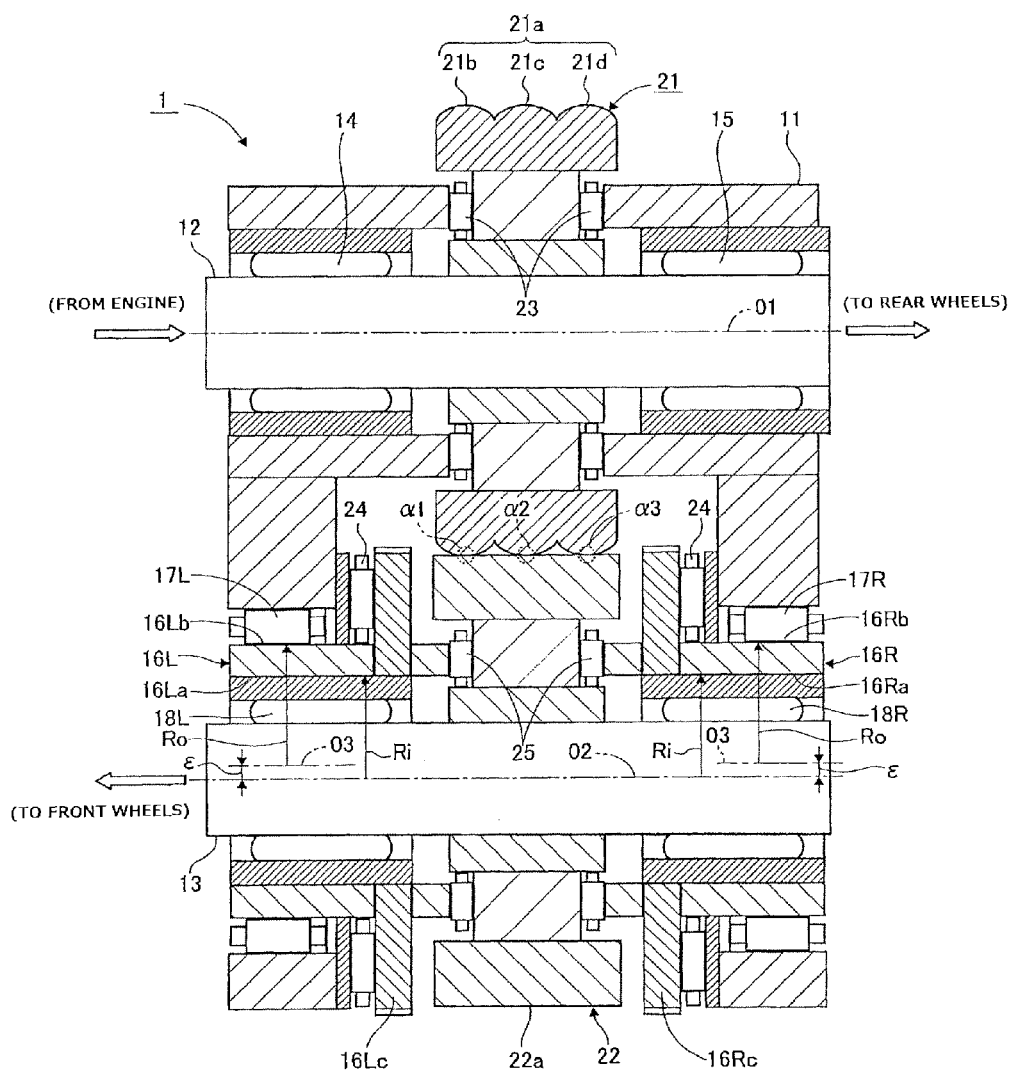
FIG. 2 is a side sectional view of the roller-type friction transmission unit of FIG. 1.

In FIG. 2, an input shaft 12 and an output shaft 13 are arranged to extend laterally in a unit housing 11 so that a rotation axis O1 of input shaft 12 and a rotation axis O2 of output shaft 13 are parallel to each other. Input shaft 12 is rotatably supported at its both ends by bearings 14, 15 with respect to unit housing 11, for free rotation around axis O1. The both ends of input shaft 12 are made to project out from unit housing 11. In FIG. 2, the left end of input shaft 12 is connected to engine 2 through the transmission 3 (see FIG. 1), whereas the right end of input shaft 12 is connected to rear final drive unit 5 through the rear propeller shaft 4 (see FIG. 1).

Output shaft 13 is rotatably supported at both ends with respect to unit housing 11 by a pivotal support structure as described below. An eccentric sleeve 16L and an eccentric sleeve 16R, each of which is in the form of a hollow outer shaft, are loosely fitted between output shaft 13 and unit housing 11 through which respective ends of output shaft 13 extend, wherein eccentric sleeves 16L, 16R are configured to be fit.

A bearing 17L is disposed between eccentric sleeve 16L and unit housing 11 so that eccentric sleeve 16L is rotatably supported through its outer peripheral surface 16Lb with respect to unit housing 11. A bearing 17R is disposed between eccentric sleeve 16R and unit housing 11 so that eccentric sleeve 16R is rotatably supported through its outer peripheral surface 16Rb with respect to unit housing 11.

A bearing 18L is disposed between eccentric sleeve 16L and output shaft 13 so that output shaft 13 is rotatably supported through its outer peripheral surface within a hollow 16La of eccentric sleeve 16L. A bearing 18R is disposed between eccentric sleeve 16R and output shaft 13 so that output shaft 13 is rotatably supported through its outer peripheral surface within a hollow 16Ra of eccentric sleeve 16R. In this way, output shaft 13 can rotate freely around the axis O2 in hollows 16La, 16Ra of eccentric sleeves 16L, 16R.

By the construction described above, both ends of output shaft 13 are rotatably supported in unit housing 11 through the eccentric sleeves 16L, 16R. In output shaft 13 thus supported in unit housing 11, the left end projecting out from unit housing 11 in FIG. 2 is connected to front propeller shaft 7 (see FIG. 1), so that the left end of output shaft 13 is connected to left and right front wheels 9L, 9R through the front propeller shaft 7 and front final drive unit 8.

Input shaft 12 is coupled integrally or formed integrally with a first roller 21 arranged at a middle portion between both ends of input shaft 12, whereas output shaft 13 is coupled integrally or formed integrally with a second roller 22 arranged at a middle portion between both ends of output shaft 13. First roller 21 and second roller 22 are arranged in a plane perpendicular to the axial direction. The place between each axial end of first roller 21 and unit housing 11 is provided with a thrust bearing 23, wherein thrust bearing 23 serves to position in the axial direction the first roller 21 as well as input shaft 12.

The outer peripheral surfaces 16Lb, 16Rb of eccentric sleeves 16L, 16R (semidiameter Ro) have a central axis O3 that is eccentric by $\epsilon$ with respect to the central axis O2 of eccentric sleeve hollows 16La, 16Ra (radius Ri). In this construction, when eccentric sleeves 16L, 16R are rotated with respect to unit housing 11 around the rotation axis O3, the rotation axis O2 of output shaft 13 and second roller 22 rotates around the rotation axis O3. Accordingly, the radial pressing force from second roller 22 (outer peripheral surface 22a) to first roller 21 (outer peripheral surface 21a) varies and thereby allows the contact friction force (transmitted torque capacity) between first roller 21 and second roller 22 to be controlled.

In order to allow control of the rotational position of eccentric sleeves 16L, 16R around the rotation axis O3, ring gears 16Lc, 16Rc are provided integrally with eccentric sleeves 16L, 16R, close to respective ones of the ends of eccentric sleeves 16L, 16R facing each other. These ring gears 16Lc, 16Rc are meshed with a common eccentric sleeve drive pinion not shown which is configured to be fit. The eccentric sleeve drive pinion is coupled to an inter-roller radial pressing force control motor not shown.

The eccentric sleeve drive pinion is meshed with ring gears 16Lc, 16Rc by setting the eccentric sleeves 16L, 16R in such rotational positions that the eccentric outer peripheral surfaces 16Lb, 16Rb are aligned with each other in the circumferential direction, and then meshing the eccentric sleeve drive pinion with the ring gears 16Lc, 16Rc.

A thrust bearing 24 is disposed between each ring gear 16Lc, 16Rc and unit housing 11. A thrust bearing 25 is disposed between second roller 22 and each eccentric sleeve 16L, 16R. These thrust bearings 24, 25 serve to position the eccentric sleeves 16L, 16R and second roller 22 (output shaft 13) in the axial direction.

If both of the outer peripheral surface 21a of first roller 21 and the outer peripheral surface 22a of second roller 22 in frictional contact with one another as described above are cylindrical surfaces, the roller outer peripheral surfaces 21a, 22a are in line contact with one another. Accordingly, if the parallelism between the rotation axis O1 and rotation axis O2 is lowered by errors in assembling or errors in precision of parts, it significantly adversely affects the endurance and transmission efficiency of the roller-type friction transmission unit, which is not robust.

On the other hand, in the case of the conventional roller-type friction transmission unit described above, the configuration that roller outer peripheral surfaces 21a, 22a are in frictional contact with each other at a single point may raise the contact pressure between the rollers at that contact point, and thereby cause the following problem.

In the roller-type friction transmission unit where roller outer peripheral surfaces 21a, 22a are in contact with each other at a single point and the contact pressure between the rollers is raised, the traction coefficient ($\mu$) between rollers 21, 22 has a characteristic of change (namely, $\mu$-V characteristic) with respect to the slip speed between rollers 21, 22 (outer peripheral surfaces 21a, 22a) in frictional contact with each other, namely, with respect to inter-roller slip speed (V), for example, as indicated by a solid line in FIG. 5, under influence of the kind of oil and operating condition (rotational speed, inter-roller radial pressing force, etc.).

The shape of this $\mu$-V characteristic is constant with respect to variation of conditions. Specifically, traction coefficient ($\mu$) rapidly rises to a maximum value immediately after the occurrence of inter-roller slip speed (V), and thereafter traction coefficient ($\mu$) gradually decreases from the maximum value as inter-roller slip speed (V) increases.

However, the ideal slip speed (Vo1) that is inter-roller slip speed (V) when traction coefficient ($\mu$) reaches the maximum value ($\mu$max1), and the maximum value (pmax) of traction coefficient ($\mu$), and the range of negative gradient in which traction coefficient ($\mu$) gradually decreases from the maximum value ($\mu$max), and the descending gradient ($\Delta\mu$1) of traction coefficient ($\mu$) in the range of negative gradient, vary according to the contact pressure between the rollers at the spot of contact between the roller outer peripheral surfaces 21a, 22a. Specifically, as the contact pressure between the rollers increases as in the conventional configuration in which the roller outer peripheral surfaces 21a, 22a are in frictional contact with each other at a single spot, (1) ideal slip speed (Vo) decreases as (Vo1), to broaden the range of negative gradient, (2) the maximum value of traction coefficient ($\mu$) becomes small as ($\mu$max1), and (3) the descending gradient of traction coefficient ($\mu$) becomes rapid as ($\Delta\mu$1) in addition to the broadening of the range of negative gradient, thereby increasing the amount of descending of traction coefficient ($\mu$) in the range of negative gradient.

In a conventional roller-type friction transmission unit, the feature that the roller outer peripheral surfaces are in contact with each other only at one point, and the inter-roller contact pressure at that point is high, results in that the $\mu$-V characteristic has the tendencies (1)-(3) described above as indicated by the solid line in FIG. 5, so that smooth power transmission is difficult in the range of negative gradient of the $\mu$-V characteristic, wherein it is likely that judder (noise, vibration) occurs between the rollers 21, 22 (outer peripheral surfaces 21a, 22a).

The present embodiment is based on recognition that this problem is caused by the high contact pressure between the rollers 21, 22 (outer peripheral surfaces 21a, 22a). In this embodiment, in order to reduce the contact pressure between the rollers 21, 22 (outer peripheral surfaces 21a, 22a) to suppress the judder from occurring while maintaining the robustness, the configuration of outer peripheral surfaces 21a, 22a of rollers 21, 22 are modified.

Specifically, as shown in FIG. 2, the outer peripheral surface 22a of second roller 22 is formed as a cylindrical surface, while the outer peripheral surface 21a of first roller 21 is formed as a corrugated surface including a plurality (three in the case of FIG. 2) of convex surfaces 21b, 21c, 21d arranged in the axial direction, wherein each convex surface has a relatively raised portion middle in the axial direction. This allows the outer peripheral surface 21a of first roller 21 to be in contact with the outer peripheral surface 22a of second roller 22 at three spots $\alpha$1, $\alpha$2, $\alpha$3 arranged in the axial direction which spots correspond to the apexes of convex surfaces 21b, 21c, 21d respectively.

Operation of First Embodiment

The following describes operation of the roller-type friction transmission unit according to the first embodiment shown in FIGS. 1, 2. The output torque of transmission 3 in FIG. 1 is inputted into input shaft 12 from the left end in FIG. 2. On one hand, the torque is transmitted directly from input shaft 12 to left and right rear wheels (main driving wheels) 6L, 6R through the rear propeller shaft 4 and rear final drive unit 5.

On the other hand, roller-type friction transmission unit 1 directs from first roller 21 to output shaft 13 through the second roller 22 a part of torque to left and right rear wheels 6L, 6R. The torque transmitted to output shaft 13 is transmitted from the left end of output shaft 13 in FIG. 2 to left and right front wheels (auxiliary driving wheels) 7L, 7R through the front propeller shaft 7 (see FIG. 1) and front final drive unit 8.

On the other hand, roller-type friction transmission unit 1 directs from first roller 21 to output shaft 13 through the second roller 22 a part of torque to left and right rear wheels 6L, 6R. The torque transmitted to output shaft 13 is transmitted from the left end of output shaft 13 in FIG. 2 to left and right front wheels (auxiliary driving wheels) 9L, 9R through the front propeller shaft 7 (see FIG. 1) and front final drive unit 8.

In this way, the vehicle is capable of performing four wheel drive running by driving all of left and right rear wheels (main driving wheels) 6L, 6R and left and right front wheels (auxiliary driving wheels) 9L, 9R. The control of driving force distribution between left and right rear wheels 6L, 6R and left and right front wheels 9L, 9R is implemented by rotating the eccentric sleeves 16L, 16R around the axis O3 through the ring gears 16Lc, 16Rc by the inter-roller radial pressing force control motor not shown but described above.

The rotation of eccentric sleeves 16L, 16R around the axis O3 causes the rotation axis O2 of output shaft 13 and second roller 22 to rotate around the axis O3, and allows the radial pressing force from second roller 22 to first roller 21, and thereby the transmitted torque capacity between rollers 21, 22 (driving force distribution between front wheel and rear wheel), to be arbitrarily controlled by changing the inter-axis distance between rollers 21, 22, and thereby allows driving force distribution control between left and right rear wheels 6L, 6R and left and right front wheels 9L, 9R.

The roller-type friction transmission unit according to the first embodiment is configured so that the outer peripheral surface 22a of second roller 22 is formed as a cylindrical surface, hut the outer peripheral surface 21a of first roller 21 is formed as a corrugated surface including a plurality (three in the case of FIG. 2) of convex surfaces 21b, 21c, 21d arranged in the axial direction, wherein each convex surface has a relatively raised portion middle in the axial direction, and this allows the outer peripheral surface 21a of first roller 21 to be in contact with the outer peripheral surface 22a of second roller 22 at three spots α1, α2, α3 arranged in the axial direction which spots correspond to the apexes of convex surfaces 21b, 21c, 21d respectively. This serves to reduce the contact pressure between rollers 21, 22 (outer peripheral surfaces 21a, 22a) as compared to the conventional case, while maintaining the robustness, and thereby produce the following advantageous effects.

The construction that the contact pressure between rollers 21, 22 (outer peripheral surfaces 21a, 22a) is thus low serves to set the μ-V characteristic as indicated by a broken line from the solid line in FIG. 5 even when the condition is identical. Namely, (4) ideal slip speed (Vo) can be raised as high as (Vo2), thereby narrowing the range of negative gradient, and (5) the maximum value of traction coefficient (μ) can be set as high as (μmax2), and (6) the descending gradient of traction coefficient (μ) can be reduced as slow as (Δμ2), to reduce the amount of fall of traction coefficient (μ) in the range of negative gradient, in cooperation with the narrowing of the range of negative gradient.

Therefore, according to the first embodiment, the roller-type friction transmission unit is capable of performing smooth power transmission between rollers 21, 22 even in the range of negative gradient in μ-V characteristic indicated by the broken line in FIG. 5, and thereby prevent judder (noise, vibration) from occurring between rollers 21, 22 (outer peripheral surfaces 21a, 22a) in the range of negative gradient.

Second Embodiment

Figure 3:
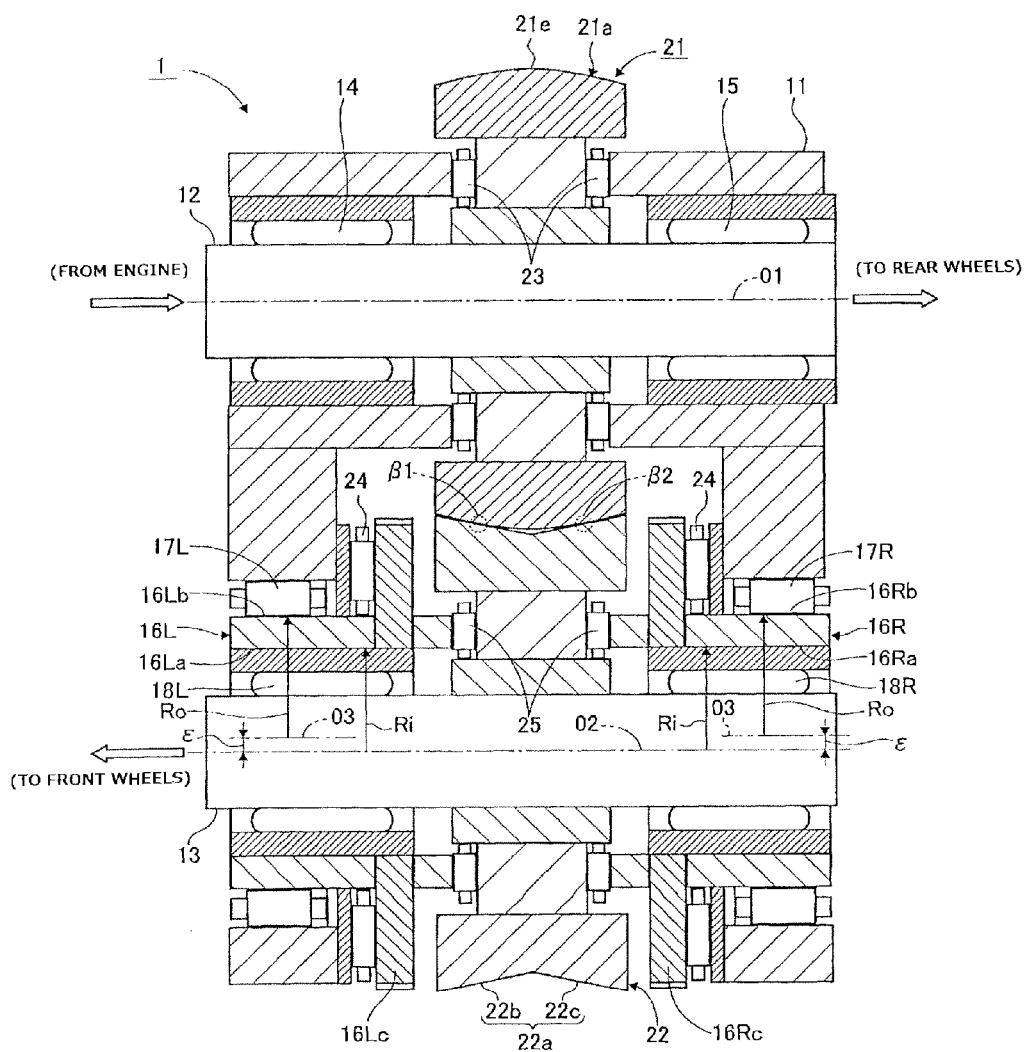
FIG. 3 is a side sectional view similar to FIG. 2, showing a roller-type friction transmission unit according to a second embodiment of the present invention.

FIG. 3 shows a roller-type friction transmission unit according to a second embodiment of the present invention. In this embodiment, the outer peripheral surface 21a of first roller 21 is formed as a single convex surface 21e including a relatively raised portion middle in the axial direction, and the outer peripheral surface 22a of second roller 22 is formed as a V-groove surface 22b, 22c including a relatively recessed portion middle in the axial direction.

By this construction, the outer peripheral surface 21a of first roller 21 formed as single convex surface 21e is in frictional contact with the V-groove surface 22b of second roller 22 constituting the outer peripheral surface 22a of second roller 22 at spot β1, whereas the outer peripheral surface 21a of first roller 21 formed as single convex surface 21e is in frictional contact with the V-groove surface 22c of second roller 22 constituting the outer peripheral surface 22a of second roller 22 at spot β2. Namely, the outer peripheral surface 21a of first roller 21 and the outer peripheral surface 22a of second roller 22 are in frictional contact with each other at spots β1, β2 arranged in the axial direction.

In the roller-type friction transmission unit according to the second embodiment, the feature that the outer peripheral surface 21a of first roller 21 and the outer peripheral surface 22a of second roller 22 are in frictional contact with each other at spots β1, β2 arranged in the axial direction serves to reduce the contact pressure between rollers 21, 22 (outer peripheral surfaces 21a, 22a) as compared to the conventional configuration, while maintaining the robustness, and thereby produce similar advantageous effects as in the first embodiment.

In addition, according to this embodiment, the feature that both of the outer peripheral surface 21a of first roller 21 and the outer peripheral surface 22a of second roller 22 have simpler shapes than the first roller outer peripheral surface 21a of the first embodiment shown in FIG. 2, serves to suppress the processing cost, which is advantageous in view of cost.

Moreover, according to this embodiment, the feature that the outer peripheral surface 21a of first roller 21 formed as single convex surface 21e and the outer peripheral surface 22a of second roller 22 formed as V-groove surface 22b, 22c serve in cooperation to equalize the contact pressures at spots β1, β2 of contact between first roller 21 and second roller 22, and thereby prevent judder from occurring due to rise of one of the contact pressures. This serves to prevent judder with more reliability than in the first embodiment.

Third Embodiment

Figure 4:
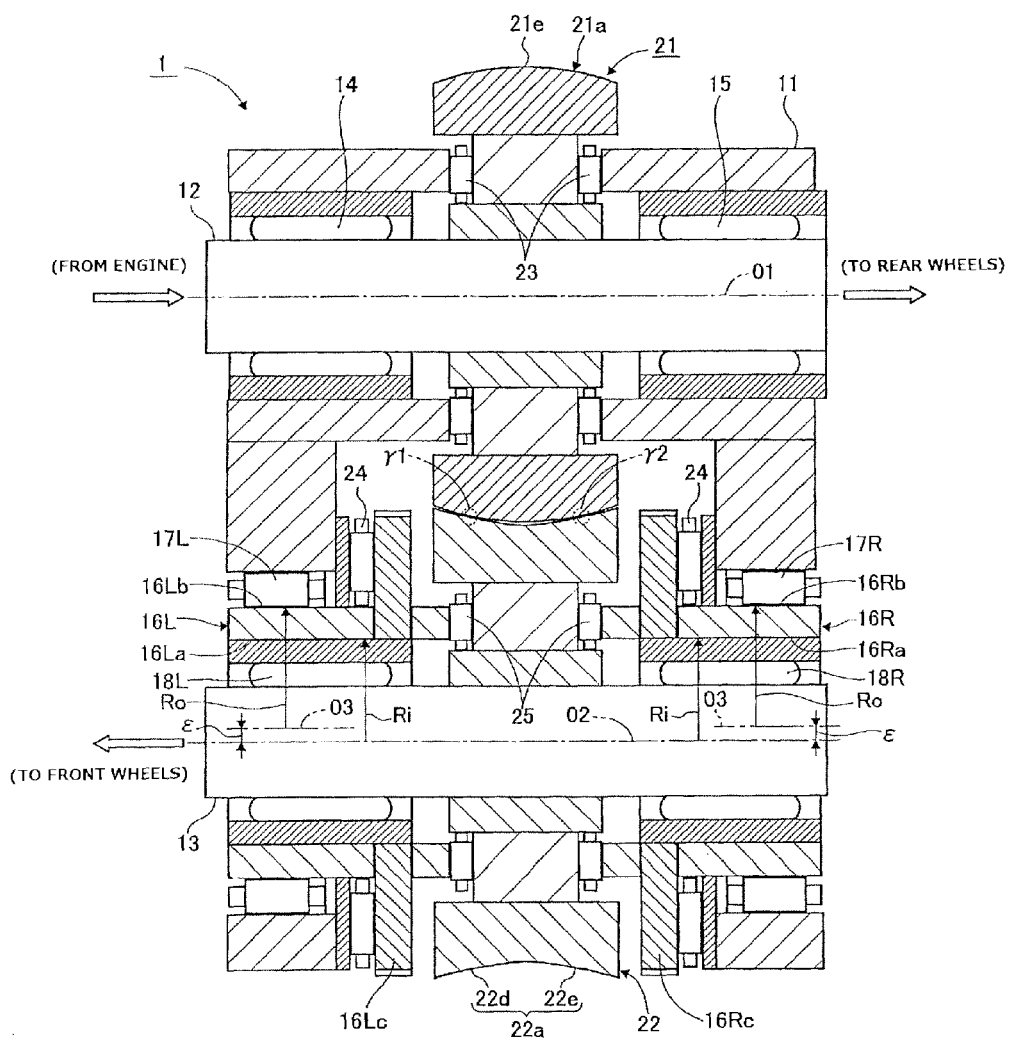
FIG. 4 is a side sectional view similar to FIG. 2, showing a roller-type friction transmission unit according to a third embodiment of the present invention.

FIG. 4 shows a roller-type friction transmission unit according to a third embodiment of the present invention. In this embodiment, the outer peripheral surface 21a of first roller 21 is formed as a single convex surface 21e including a relatively raised portion middle in the axial direction as in the second embodiment shown in FIG. 3. However, the outer peripheral surface 22a of second roller 22 is formed as a continuous concave surface including a relatively recessed portion middle in the axial direction, wherein the continuous concave surface is a combination of concave surfaces 22d, 22e configured to be in contact with the single convex surface 21e at two spots γ1, γ2 arranged in the axial direction.

By this construction, the outer peripheral surface 21a of first roller 21 formed as single convex surface 21e is in frictional contact with the first concave surface 22d of second roller 22 constituting the outer peripheral surface 22a of second roller 22 at spot γ1, whereas the outer peripheral surface 21a of first roller 21 formed as single convex surface 21e is in frictional contact with the second concave surface 22e of second roller 22 constituting the outer peripheral surface 22a of second roller 22 at spot γ2. Namely, the outer peripheral surface 21a of first roller 21 and the outer peripheral surface 22a of second roller 22 are in frictional contact with each other at spots γ1, γ2 arranged in the axial direction.

In the roller-type friction transmission unit according to the third embodiment, the feature that the outer peripheral surface 21a of first roller 21 and the outer peripheral surface 22a of second roller 22 are in frictional contact with each other at spots γ1, γ2 arranged in the axial direction serves to reduce the contact pressure between rollers 21, 22 (outer peripheral surfaces 21a, 22a) as compared to the conventional configuration, while maintaining the robustness, and thereby produce similar advantageous effects as in the first and second embodiments.

Moreover, in the third embodiment, the contact area between the outer peripheral surface 21a of first roller 21 and the outer peripheral surface 22a of second roller 22 can be set larger than in the second embodiment, because the contact between the convex surface 21e and concave surface 22d, 22e at spot γ1, γ2 is a contact between curved surfaces. Accordingly, the third embodiment makes it possible to set smaller the contact pressure between first roller 21 and second roller 22, to enhance the advantageous effects described above, than in the second embodiment.

Other Embodiments

In the embodiments described above, roller-type friction transmission unit 1 is configured to be capable of controlling the contact frictional force (transmitted torque capacity) between first roller 21 and second roller 22 by adjusting the radial pressing force from second roller 22 (outer peripheral surface 22a) to first roller 21 (outer peripheral surface 21a). However, the concept of the present invention described above can be applied also to a construction where the radial pressing force from second roller 22 (outer peripheral surface 22a) to first roller 21 (outer peripheral surface 21a) is fixed and incapable of being adjusted, and the contact frictional force (transmitted torque capacity) between first roller 21 and second roller 22 cannot be controlled.

Moreover, in any of the embodiments, the shape of the first roller outer peripheral surface 21a and the shape of the second roller outer peripheral surface 22a may be replaced with each other as different from the examples shown in the drawings. These modified examples produce similar advantageous effects.

The invention claimed is:

1. A roller-type friction transmission unit, wherein:
an outer peripheral surface of a first roller and an outer peripheral surface of a second roller are pressed in a radial direction of the first and second rollers into pressing contact with one another, to allow frictional power transmission between the first and second rollers;
one of the first and second rollers is connected to a driveline to main driving wheels of a four wheel drive vehicle;
another one of the first and second rollers is connected to a driveline to auxiliary driving wheels of the four wheel drive vehicle; and
the outer peripheral surface of the first roller and the outer peripheral surface of the second roller are shaped to allow the outer peripheral surface of the first roller and the outer peripheral surface of the second roller to be in contact with one another at a plurality of spots arranged in an axial direction of the first and second rollers.

2. The roller-type friction transmission unit as claimed in claim 1, wherein:
one of the outer peripheral surface of the first roller and the outer peripheral surface of the second roller is formed as a cylindrical surface; and
another one of the outer peripheral surface of the first roller and the outer peripheral surface of the second roller is formed as a corrugated surface including a plurality of convex surfaces arranged in the axial direction, wherein each convex surface has a relatively raised portion middle in the axial direction.

3. The roller-type friction transmission unit as claimed in claim 1, wherein:
one of the outer peripheral surface of the first roller and the outer peripheral surface of the second roller is formed as a single convex surface including a relatively raised portion middle in the axial direction;
another one of the outer peripheral surface of the first roller and the outer peripheral surface of the second roller is formed as a V-groove surface including a relatively recessed portion middle in the axial direction; and
the outer peripheral surface of the first roller and the outer peripheral surface of the second roller are configured to be in contact with one another at two spots arranged in the axial direction.

4. The roller-type friction transmission unit as claimed in claim 1, wherein:
one of the outer peripheral surface of the first roller and the outer peripheral surface of the second roller is formed as a single convex surface including a relatively raised portion middle in the axial direction; and
another one of the outer peripheral surface of the first roller and the outer peripheral surface of the second roller is formed as a continuous concave surface including a relatively recessed portion middle in the axial direction, wherein the continuous concave surface is a combination of concave surfaces configured to be in contact with the single convex surface at two spots arranged in the axial direction.

* * * * *